United States Patent
Merkle, Jr. et al.

(10) Patent No.: US 8,759,107 B2
(45) Date of Patent: **\*Jun. 24, 2014**

(54) TITANIUM BEARING MATERIAL FLOW CONTROL IN THE MANUFACTURE OF TITANIUM TETRACHLORIDE USING A COMBINATION OF FEEDBACK AND FEED FORWARD RESPONSES

(76) Inventors: James Elliott Merkle, Jr., Long Beach, MS (US); Raymond Roy Beets, Jr., Long Beach, MS (US)

( * ) Notice: Subject to any disclaimer, the term of this patent is extended or adjusted under 35 U.S.C. 154(b) by 186 days.

This patent is subject to a terminal disclaimer.

(21) Appl. No.: 13/392,603

(22) PCT Filed: Sep. 2, 2010

(86) PCT No.: PCT/US2010/047627
§ 371 (c)(1),
(2), (4) Date: Feb. 27, 2012

(87) PCT Pub. No.: WO2011/028869
PCT Pub. Date: Mar. 10, 2011

(65) Prior Publication Data
US 2012/0156789 A1    Jun. 21, 2012

Related U.S. Application Data

(60) Provisional application No. 61/239,551, filed on Sep. 3, 2009.

(51) Int. Cl.
*G01N 35/00* (2006.01)
*C22B 34/12* (2006.01)
*C01G 23/02* (2006.01)
*B01J 8/18* (2006.01)

(52) U.S. Cl.
CPC ......... *C22B 34/1231* (2013.01); *C01G 23/022* (2013.01); *B01J 8/1809* (2013.01)

USPC ............................................................ 436/55

(58) Field of Classification Search
None
See application file for complete search history.

(56) References Cited

U.S. PATENT DOCUMENTS

| | | |
|---|---|---|
| 2,446,181 A | 4/1946 | Kraus |
| 2,701,179 A | 2/1955 | McKinney |
| 3,591,333 A | 7/1971 | Carlson et al. |
| 3,883,636 A | 5/1975 | Cole et al. |
| 4,854,972 A | 8/1989 | Garrido et al. |
| 6,399,033 B1 | 6/2002 | Hartmann |
| 2002/0114761 A1 | 8/2002 | Akhtar et al. |
| 2008/0098933 A1 | 5/2008 | Killat |

FOREIGN PATENT DOCUMENTS

| | | |
|---|---|---|
| EP | 1717203 | 11/2006 |
| WO | WO96/34992 | 11/1996 |
| WO | WO2004/060808 | 7/2004 |
| WO | WO2006/115402 | 11/2006 |

OTHER PUBLICATIONS

International Search Report, Dec. 14, 2010.

*Primary Examiner* — Robert Xu
(74) *Attorney, Agent, or Firm* — Daphne Pinto Fickes

(57) ABSTRACT

This disclosure relates to process for controlling chlorination reactions in manufacturing titanium tetrachloride in a fluidized bed reactor, optionally followed by processing to form a titanium product comprising a minor amount of silica, the process comprising: (a) feeding carbonaceous material, titanium bearing material comprising an amount of silica, and chlorine to the fluidized bed reactor to form a gaseous stream, and condensing the gaseous stream to form titanium tetrachloride, a non-condensed gas stream and a condensable product stream, wherein at least one of the titanium tetrachloride and the non-condensed gas stream comprise silicon tetrachloride; (b) analyzing the non-condensed gas stream, the titanium tetrachloride or both, to determine the analyzed concentration of silicon tetrachloride; (c) identifying a set point concentration of silicon tetrachloride based on the desired amount of silica in the titanium product; (d) calculating the difference between the analyzed concentration of silicon tetra-chloride and the set point concentration of silicon tetra-chloride; (e) measuring the titanium tetrachloride flow to a processing reactor that releases chlorine; (f) measuring the flow of fresh chlorine added to the fluidized bed; (g) measuring the flow of the titanium bearing material added to the fluidized bed reactor and establishing a historic average flow of the titanium bearing material added to the fluidized bed reactor; (h) calculating the chlorine released from the titanium tetrachloride that is processed using the titanium tetrachloride flow data from step (e); (i) calculating the total chlorine flow to the fluidized bed reactor by adding the chlorine flow in step (f) to the chlorine flow calculated in step (h) and establishing a historic average chlorine flow; (j) calculating a unit titanium bearing material consumption per unit chlorine; (k) calculating an estimated current consumption rate of titanium bearing material based on the total chlorine flow from step (i) times the unit titanium bearing material consumption per unit chlorine from step (j); and (l) generating a signal based on difference generated in step (d) that provides a feedback response and combining this to the estimated current consumption rate of titanium bearing material from step (k) to provide a feed forward response to control the flow of the titanium bearing material into the fluidized bed reactor.

17 Claims, 1 Drawing Sheet

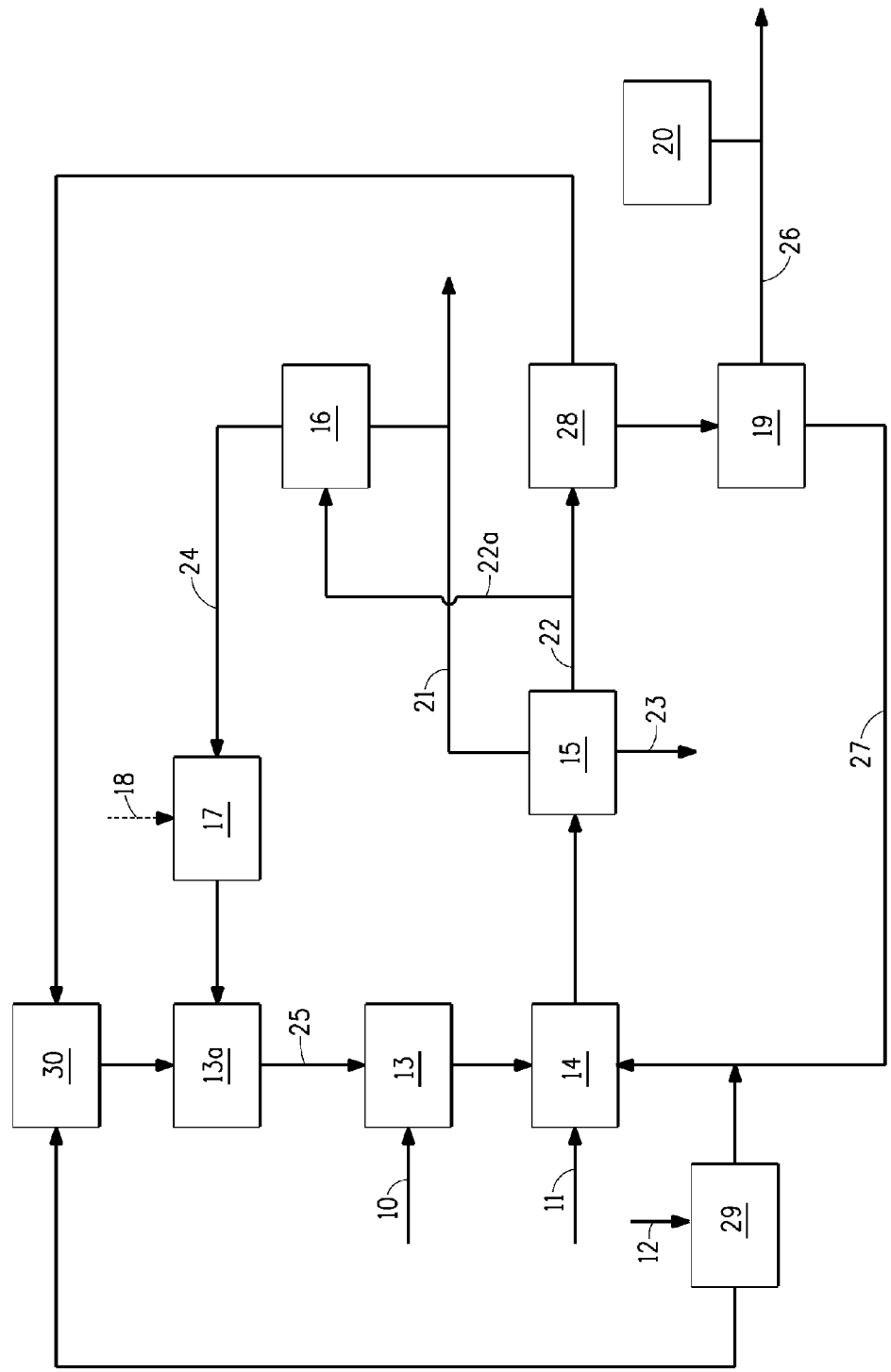

TITANIUM BEARING MATERIAL FLOW CONTROL IN THE MANUFACTURE OF TITANIUM TETRACHLORIDE USING A COMBINATION OF FEEDBACK AND FEED FORWARD RESPONSES

FIELD OF THE DISCLOSURE

The present disclosure relates to a process for manufacturing titanium tetrachloride, and in particular to a control process for controlling the flow of titanium bearing material into the fluidized bed reactor and thereby the amount of silicon in the final product.

BACKGROUND OF THE DISCLOSURE

The process for chlorinating titanium containing materials in a fluidized bed reactor is known. Suitable processes are disclosed in the following U.S. Pat. Nos. 2,701,179; 3,883,636; 3.591333; and 2,446,181. In such processes, particulate coke, particulate titanium bearing materials, chlorine and optionally oxygen or air are fed into a reaction chamber, and a suitable reaction temperature, pressure and flow rates are maintained to sustain the fluidized bed. Gaseous titanium tetrachloride and other metal chlorides are exhausted from the reaction chamber. The gaseous titanium tetrachloride so produced can then be separated from the other metal chlorides and exhaust gas and used to produce titanium dioxide, titanium metal or titanium containing product.

In the chlorination process to prepare titanium tetrachloride, $TiCl_4$, in a fluidized bed reactor, it is desirable to reduce or control the formation of excess silicon tetrachloride and other undesirable chlorinated organic species. Silicon tetrachloride, $SiCl_4$, contamination of titanium tetrachloride impacts a variety of quality parameters, such as particle size distribution and primary particle size (indicated by carbon black undertone) of the titanium dioxide produced by oxidation of the $TiCl_4$. Minimizing or controlling the silica contamination allows for improved performance of the $TiO_2$ product.

A need exists for a control process that detects the presence of excess $SiCl_4$, and therefore excess silica in the final product, and that is capable of correcting the problem.

SUMMARY OF THE DISCLOSURE

In a first aspect, the disclosure provides a process for controlling chlorination reactions in manufacturing titanium tetrachloride in a fluidized bed reactor, optionally followed by processing to form a titanium product comprising an amount, typically a minor amount, of silica, the process comprising:

(a) feeding carbonaceous material, titanium bearing material comprising an amount of silica, and chlorine to the fluidized bed reactor to form a gaseous stream, and condensing the gaseous stream to form titanium tetrachloride, a non-condensed gas stream and a condensable product stream, wherein at least one of the titanium tetrachloride and the non-condensed gas stream comprise silicon tetrachloride;

(b) analyzing the non-condensed gas stream, the titanium tetrachloride or both, to determine the analyzed concentration of silicon tetrachloride;

(c) identifying a set point concentration of silicon tetrachloride based on the desired amount of silica in the titanium product;

(d) calculating the difference between the analyzed concentration of silicon tetrachloride and the set point concentration of silicon tetrachloride;

(e) measuring the titanium tetrachloride flow to a processing reactor that releases chlorine;

(f) measuring the flow of fresh chlorine added to the fluidized bed;

(g) measuring the flow of the titanium bearing material added to the fluidized bed reactor and establishing a historic average flow of the titanium bearing material added to the fluidized bed reactor;

(h) calculating the chlorine released from the titanium tetrachloride that is processed using the titanium tetrachloride flow data from step (e);

(i) calculating the total chlorine flow to the fluidized bed reactor by adding the chlorine flow in step (f) to the chlorine flow calculated in step (h) and establishing a historic average chlorine flow;

(j) calculating a unit titanium bearing material consumption per unit chlorine;

(k) calculating an estimated current consumption rate of titanium bearing material based on the total chlorine flow from step (i) times the unit titanium bearing material consumption per unit chlorine from step (j); and (l) generating a signal based on difference generated in step (d) that provides a feedback response and combining this with the estimated current consumption rate of titanium bearing material from step (k) to provide a feed forward response by adding together, multiplying or other algorithm to control the flow of the titanium bearing material into the fluidized bed reactor.

BRIEF DESCRIPTION OF THE DRAWINGS

FIG. 1 sets forth a simplified schematic flow diagram of an embodiment of this disclosure.

DETAILED DESCRIPTION OF THE DISCLOSURE

Carbonaceous material, titanium bearing material containing some impurities, chlorine, and optionally oxygen or air are fed into a fluidized bed reactor. Typical conditions and specifications for fluidized beds useful for this disclosure are as follows: reaction temperature of about 900° C. to 1300° C., pressure of about 1-3 atmospheres, and a reactor with multiple jets in or near the base. Typically, the point of introduction of the chlorine will be located within about 0 to about 10 feet (about 0 to about 3 m), more typically about 0 to about 8 feet (about 0 to about 2.4 m) and most typically about 0 to about 5 feet (about 0 to about 1.5 m) of the base of the reactor. A most typical location is in the base of the reactor.

The titanium bearing material can be any suitable titanium source material such as titanium containing ores including rutile, ilmenite or anatase ore; beneficiates thereof; titanium containing byproducts or slags; and mixtures thereof. Ordinarily, the titanium bearing material contains iron oxide in the amount of about 0.5-50%, and typically up to about 20% by weight, based on the total weight of the titanium bearing material. This material also typically contains silica. The silica can be present in any form, such as in a silica-containing material or a metallic oxide, but is usually in the form of one or more naturally occurring forms such as sand, quartz, silicates, silica. SiO2, and Crystobalite. The silica can be in the amount of about 0 to about 25%, and typically about 0.5 to about 1.5%, based on the total weight of the titanium bearing material. The amount of silicon in the titanium bearing material can be determined by XRF analysis or wet chemistry methods or other suitable analytical procedure. The silica can be the source of silicon tetrachloride in the gaseous stream of the fluidized bed reactor.

Suitable carbonaceous material for use in this disclosure is any carbonaceous material which has been subjected to a coking process. Typical is coke or calcined coke which is derived from petroleum or coal or mixtures of such cokes.

As shown in FIG. 1, a titanium bearing material 10 is fed through a control device 13 to the fluidized bed reactor 14. Carbonaceous material 11 is fed directly into the fluidized bed reactor 14. Alternately, carbonaceous material 11 may be fed to the fluidized bed reactor 14 via a control device. The titanium bearing material and the carbonaceous material can also be combined prior to being fed to the fluidized bed reactor 14. The chlorine 12 is fed into the fluidized bed reactor 14 with a recycle stream 27 that recycles chlorine liberated during the processing, typically oxidation, of $TiCl_4$ to $TiO_2$ in the $TiCl_4$ processing reactor 19, typically an oxidation reactor or if chlorine is released during other processing. Chlorine can also be added at different points in the fluidized bed reactor using techniques known to one skilled in the art. Gaseous reaction products from the fluidized bed reactor are cooled in condenser(s) 15, in stages, to first condense and remove iron and metal chlorides other than titanium tetrachloride 22. The iron and metal chlorides form the condensable product stream 23. The remaining product from the reactor is then cooled to condense titanium tetrachloride 22 leaving a non-condensed gas stream 21 comprising $N_2$, COS, $SO_2$, CO, $CO_2$, and HCl and other components such as $SiCl_4$. A portion or all of the non-condensed gas stream 21, i.e., a sample stream, is sent to an analytical device or analyzer 16 such as a spectrometer, spectrophotometer and chromatograph. Alternately, the titanium tetrachloride 22 may be sampled using the titanium tetrachloride sample stream 22a or both streams may be sampled and analyzed.

A sampling system may be required depending on the type of analyzer chosen, the condition of the non-condensed gas and/or the placement of the analyzer. The analytical device can be in-line, meaning installed directly in the path of the stream to be analyzed, typically the non-condensed gas stream 21, or on-line, meaning a portion of the stream to be analyzed, typically the non-condensed gas stream 21, is directed away from the main process stream and toward the analytical device or off-line meaning a sample is collected and analyzed discretely. The sample stream is analyzed for $SiCl_4$ concentration. The analysis is able to proceed quickly, semi continuously and quantitatively. Suitable means of analysis include, but are not limited to spectroscopy, spectrometry and chromatography. Typically, a spectroscopic method is used to analyze the $SiCl_4$ concentration of the non-condensed gas stream 21, titanium tetrachloride 22 or both streams. More typically, infrared spectroscopy and most typically, Fourier transform infrared spectroscopy is used as the analytical method. Optionally, any portion of the sample stream can be returned to the stream being analyzed, typically the non-condensed gas stream 21, if desired, or sent to a process ventilation system.

For purposes of TiO2 bearing material feed control only one $SiCl_4$ measurement method and one sample location can be used or a combination of feed back controllers can be used such as in a cascade control scheme.

A first signal 24 (electrical, pneumatic, digital, manual, etc.) is generated from the analysis that is related to the $SiCl_4$ concentration in the non-condensed gas stream 21. Alternately, the first signal 24 is generated from the analysis that is related to the $SiCl_4$ concentration in the titanium tetrachloride or both the non-condensed gas stream and the titanium tetrachloride. The signal proceeds to a control system (such as a distributed control system or other feedback control system 17) where its value is compared to a set point 18 or determined if it is within a set range. The set point can be a single value reflecting an acceptable silicon tetrachloride concentration or the upper limit of a range of values within which an acceptable silicon tetrachloride concentration can be. This set point 18 is a predetermined or a preset value meaning it is a desired or acceptable $SiCl_4$ concentration. The $SiCl_4$ concentration is dependent on the desired concentration of silicon in the titanium product. The $SiCl_4$ concentration in the non-condensed gas stream 21 is related to the amount of silicon in the titanium product. The relationship between the $SiCl_4$ measured in the non-condensed gas stream and the titanium product will be dependent on operating factors such as the temperature and pressure upstream of the analysis. Typically if operating the equipment upstream near $-10°$ centigrade, about 0 to about 0.3 mole % of the total gases in the non-condensed gas stream will be $SiCl_4$. Subtracting the $SiCl_4$ concentration from the analysis from the predetermined acceptable mole % $SiCl_4$ set point concentration can provide the $SiCl_4$ concentration difference that will generate the signal that adjusts the flow of the titanium bearing material 10 to the fluidized bed reactor 14. Under these conditions the full range of concentration of $SiCl_4$ is about 0 to about 0.3 mole %, typically about 0.01 to about 0.1 mole % and more typically about 0.01 to about 0.05 mole %, corresponding to about 0 to about 0.3 weight % $SiO_2$, typically about 0.0 to about 0.1 mole % $SiO_2$ and more typically 0.01-0.06 mole % $SiO_2$, respectively in the oxidized product. However, silicon content can vary significantly, for example, based on the temperature and pressure upstream, and these differences must be taken into account when determining a set point for $SiCl_4$ concentration in the non-condensed gas stream 21. The $SiCl_4$ concentration set point has the broad limits of about 0.01 to about 0.25 mole % based on the total $SiCl_4$ content of the non-condensed gas stream 21. The set point can be any desired value within this range. Typically, the $SiCl_4$ concentration set range is about 0.005 to about 0.05 mole % and more typically about 0.01 to about 0.04 mole % of the total content non-condensed gas stream 21. It is important that the lower limit to the set range of $SiCl_4$ concentration is not below the detectability limit of the analytical device being used.

If the controlled variable does not equal the set point or is outside of the set range, then the difference between the measured controlled variable and set point concentration or concentration range upper limit is determined. A second signal (electrical, pneumatic, digital, manual, etc.) corresponding to this difference is generated either manually or by a suitable feedback controller 17 such as, for example, a proportional, a proportional integral or a proportional integral derivative action controller or other suitable computer software or algorithm that provides a feedback response to the control device 13 which will cause a change in the amount of titanium bearing material being added to the fluidized bed reactor by making a change, typically a proportional change, in the flow rate of the titanium bearing material to the fluidized bed reactor 14. With continuous or discrete monitoring of the controlled variable, the amount of the titanium bearing material added to the fluidized bed reactor can be changed until the controlled variable reaches the set point or is within the set range, as specified for the process. If the $SiCl_4$ concentration in the non-condensed gas stream 21 is determined to be outside of the set range, appropriate changes to the amount of the titanium bearing material being added to the fluidized bed reactor 14 will be implemented. For example, if it is found that the analyzed $SiCl_4$ concentration is above the set point, the amount of the titanium bearing material being added to the fluidized bed reactor 14 will be increased by an amount proportional to the amount of $SiCl_4$ above the upper limit or set point. Alternately, the amount of titanium bearing material can be decreased if the silicon tetrachloride concentration analyzed is below the set point.

The process further includes measuring the titanium tetrachloride flow to the titanium tetrachloride processing reactor 19, typically an oxidation reactor, using a flow transmitter 28 in the feed line to the reactor. Flow of fresh chlorine added to the fluidized bed reactor is measured using a flow transmitter(s) 29 wherever chlorine is added into the fluidized bed. The flow of the titanium bearing material added to the fluidized bed reactor can be measured using X-ray fluorescence or other suitable analytical technique and any suitable flow measurement technique. A historic average flow of the titanium bearing material is established by averaging the flow of titanium bearing material to the fluidized bed reactor over a suitably long period of time so as to dampen out the impact of minor fluctuations in the process. A suitable time period is a month of fluidized bed operation. The chlorine released from the titanium tetrachloride that is processed, typically oxidized, is calculated using the titanium tetrachloride flow data from step (d) using the molecular weights of titanium tetrachloride and chlorine. The total chlorine flow to the chlorinator is calculated by adding the chlorine flow of the freshly added chlorine to the chlorine released during processing of the titanium tetrachloride that is recycled back to the fluidized bed 14 via recycle gas line 27. A historic average chlorine flow is established by averaging the flow of chlorine to the fluidized bed reactor over a suitably long period of time so as to dampen out the impact of minor fluctuations in the process. A suitable time period is a month of fluidized bed operation.

In step (j), the unit titanium bearing material consumption per unit chlorine can then be calculated. This can be done based on the composition of the titanium bearing material and the known chemistry of the conversion of the titanium bearing material chemical conversion to chlorides or using the following equation:

(unit titanium bearing material consumption per unit chlorine)=(historic average flow of the titanium bearing material from step (g))/(historic average chlorine flow from step (i)).

This number is dependent on the % titanium dioxide ore being used.

In step (k), the estimated current consumption rate of titanium bearing material is calculated based on the total chlorine flow from step (i) times the unit titanium bearing material consumption per unit chlorine from step (j). A feed forward response is generated by the feed forward controller 30, using the estimated current consumption rate of titanium bearing material from step (k). This is dependent on the size of the plant.

The feed forward response is provided by a feed forward controller selected from the group consisting of a proportional action controller, a proportional integral action controller, a proportional integral derivative action controller; or suitable computer software or algorithm that provides a feed forward response to a control device.

The signals from the feedback and feed forward responses are used control the flow of the titanium bearing material 10 into the fluidized bed reactor 14. In one embodiment, the signal generated in step (l) is added to the estimated current consumption rate of titanium bearing material to control the flow of the titanium bearing material into the fluidized bed reactor. In another embodiment, the signal generated in step (l) is multiplied to the estimated current consumption rate of titanium bearing material to control the flow of the titanium bearing material into the fluidized bed reactor. Alternately, other algorithms can be used.

A typical titanium product produced from the titanium tetrachloride of this disclosure is titanium dioxide in which case the fluidized bed reactor can be followed by oxidation to form a suitable titanium dioxide product such as pigmentary titanium dioxide or titanium dioxide nanoparticles. Other titanium products are also contemplated such as titanium metal which can be made from the titanium tetrachloride by a known processes such as the Kroll and Hunter processes. The process of this disclosure which permits control of the silicon tetrachloride can produce a useful titanium dioxide product having a low and controlled silica concentration.

Assuming there is no separate source of $SiCl_4$ added directly to the $TiCl_4$ prior to the oxidation reactor or there is no $SiCl_4$ added directly to the $TiCl_4$ oxidation reactor, the correlation between silicon tetrachloride concentration in the titanium tetrachloride or the concentration of $SiCl_4$ measured in the non condensed stream 21 and silica ($SiO_2$) concentration in the titanium dioxide directly withdrawn from the oxidation process without any further treatment ("base titanium dioxide") is very good. Thus, the process of the disclosure can reduce or control the base titanium dioxide silica concentration in a range from about 0.0 to 0.3 weight %, typically, the $SiO_2$ concentration range is about 0 to about 0.1 weight % and more typically about 0.01 to about 0.06 weight % based on the analytical device or analyzer 20 such as a spectrometer, spectrophotometer and chromatograph. If a separate source of $SiCl_4$ is added directly to the $TiCl_4$ prior to the oxidation reactor or $SiCl_4$ is added directly to the $TiCl_4$ oxidation reactor, the standard deviation of the silica in the final product can be improved by controlling the $SiCl_4$ in the titanium tetrachloride 22 or the non-condensed stream 21.

The disclosure can additionally provide an improved process for controlling chlorination reactions in the manufacture of titanium tetrachloride in a fluidized bed reactor.

To give a clearer understanding of the disclosure, the following example is construed as illustrative and not limitative of the underlying principles of the disclosure in any way whatsoever.

EXAMPLE $SiCl_4$ in the non-condensed gas stream is related to the $SiCl_4$ in the condensed $TiCl_4$. A portion of the $SiCl_4$ in the condensed $TiCl_4$ is oxidized to $SiO_2$ in the base $TiO_2$ pigment. The correlation between the $SiCl_4$ in the non-condensed gas stream and the $SiO_2$ in the base $TiO_2$ pigment is very good.

$SiO_2$ concentration in the base pigment is known to correlate with a variety of quality parameters, such as particle size distribution and primary particle size (indicated by carbon black undertone) of the titanium dioxide produced by oxidation of the $TiCl_4$. By controlling the $SiCl_4$ concentration, variability in these parameters can be reduced and the product quality improved.

Over a period of four and a half months experimentation was carried out in a plant to demonstrate the effect of automated $SiCl_4$ control. Four hundred and eighty three consecutive product samples were collect and analysed for $SiO_2$. This was compared with 483 samples prior to any silica control. The variability in the product $SiO_2$ concentration was measured and provided in Table 1.

TABLE 1

| | Base TiO$_2$ Product SiO$_2$ Concentration Standard Deviation |
|---|---|
| TiO$_2$ Bearing Material Feed Control Method | 0.0463 |
| SiCl$_4$ Based TiO$_2$ Bearing Material Feed Control Method | 0.0228 |
| Reduction in Base Pigment SiO$_2$ Standard Deviation | 51% |

The previous TiO$_2$ bearing material feed control method noted in Table 1 was based on reactions in the chlorinator including theoretical consumption rate of titanium bearing materials and inferential chlorine discharge rate.

From the foregoing description, one skilled in the art can easily ascertain the essential characteristics of the disclosure, and without departing from the spirit and scope thereof, can make various changes and modification of the disclosure to adapt it to various usages and conditions.

Having thus described and exemplified the disclosure with a certain degree of particularity, it should be appreciated that the following claims are not to be limited but are to be afforded a scope commensurate with the wording of each element of the claims and equivalents thereof.

What is claimed is:

1. A process for controlling chlorination reactions in manufacturing titanium tetrachloride in a fluidized bed reactor, optionally followed by processing to form a titanium product comprising a minor amount of silica, the process comprising:
   (a) feeding carbonaceous material, titanium bearing material comprising an amount of silica, and chlorine to the fluidized bed reactor to form a gaseous stream, and condensing the gaseous stream to form titanium tetrachloride, a non-condensed gas stream and a condensable product stream, wherein at least one of the titanium tetrachloride and the non-condensed gas stream comprise silicon tetrachloride;
   (b) analyzing the non-condensed gas stream, the titanium tetrachloride or both, to determine the analyzed concentration of silicon tetrachloride;
   (c) identifying a set point concentration of silicon tetrachloride based on the desired amount of silica in the titanium product;
   (d) calculating the difference between the analyzed concentration of silicon tetrachloride and the set point concentration of silicon tetrachloride;
   (e) measuring the titanium tetrachloride flow to a processing reactor that releases chlorine;
   (f) measuring the flow of fresh chlorine added to the fluidized bed;
   (g) measuring the flow of the titanium bearing material added to the fluidized bed reactor and establishing a historic average flow of the titanium bearing material added to the fluidized bed reactor;
   (h) calculating the chlorine released from the titanium tetrachloride that is processed using the titanium tetrachloride flow data from step (e);
   (i) calculating the total chlorine flow to the fluidized bed reactor by adding the chlorine flow in step (f) to the chlorine flow calculated in step (h) and establishing a historic average chlorine flow;
   (j) calculating a unit titanium bearing material consumption per unit chlorine;
   (k) calculating an estimated current consumption rate of titanium bearing material based on the total chlorine flow from step (i) times the unit titanium bearing material consumption per unit chlorine from step (j); and
   (l) generating a signal based on difference generated in step (d) that provides a feedback response and combining this to the estimated current consumption rate of titanium bearing material from step (k) to provide a feed forward response to control the flow of the titanium bearing material into the fluidized bed reactor.

2. The process of claim 1 wherein the analyzed concentration of silicon tetrachloride is greater than the set point concentration of silicon tetrachloride.

3. The process of claim 1 wherein the analyzed concentration of silicon tetrachloride is less than the set point concentration of silicon tetrachloride.

4. The process of claim 2 wherein the analyzed concentration of silicon tetrachloride is greater than the set point concentration of silicon tetrachloride and the feedback response comprises increasing the amount of titanium bearing material being introduced into the fluidized bed reactor.

5. The process of claim 3 wherein the analyzed concentration of silicon tetrachloride is less than the set point concentration of silicon tetrachloride and the feedback response comprises decreasing the amount of titanium bearing material being introduced into the fluidized bed reactor.

6. The process of claim 1 wherein the analyzed concentration of silicon tetrachloride is determined by analyzing the non-condensed gas stream.

7. The process of claim 1 wherein the analyzed concentration of silicon tetrachloride is determined by analyzing the titanium tetrachloride.

8. The process of claim 1 wherein analyzing the non-condensed gas stream is achieved by spectroscopy, spectrometry or chromatography.

9. The process of claim 8 wherein analyzing the non-condensed gas stream is
   by infrared spectroscopy.

10. The process of claim 1 wherein the silicon tetrachloride is present in the non-condensed gas stream in the amount of about 0 to about 0.3 mole %, based on the total weight of the analyzed stream.

11. The process of claim 10 wherein the silicon tetrachloride is present in the non-condensed gas stream in the amount of about 0.01 to about 0.1 mole %, based on the total weight of the analyzed stream.

12. The process of claim 11 wherein the silicon tetrachloride is present in the non-condensed gas stream in the amount of about 0.01 to about 0.05 mole %, based on the total weight of the analyzed stream.

13. The process of claim 1 wherein the set point of silicon tetrachloride is about 0.01 to about 0.25 mole %.

14. The process of claim 1 wherein the signal is electrical, pneumatic, digital or manual.

15. The process of claim 1 wherein the feedback response is provided by a feedback controller selected from the group consisting of a proportional, a proportional integral action controller, a proportional integral derivative action controller; or suitable computer software or algorithm that provides a feedback response to a control device.

16. The process of claim 1 wherein the processing reactor is an oxidation reactor and the titanium tetrachloride is oxidized to a titanium product comprising titanium dioxide.

17. The process of claim 1 wherein the feed forward response is provided by a feed forward controller selected from the group consisting of a proportional action controller, a proportional integral action controller, a proportional integral derivative action controller; or suitable computer software or algorithm that provides a feed forward response to a control device.

* * * * *